United States Patent [19]
Whinnett et al.

[11] Patent Number: 5,625,875
[45] Date of Patent: Apr. 29, 1997

[54] METHOD FOR ALLOCATING COMMUNICATIONS RESOURCES IN A RADIO COMMUNICATIONS SYSTEM

[75] Inventors: Nicholas Whinnett, London; William N. Robinson, Weybourne; Jonathan A. Gibbs, Southampton; Anthony P. Van Den Heuvel, Windlesham, all of United Kingdom

[73] Assignee: Motorola, Inc., Schaumburg, Ill.

[21] Appl. No.: 417,567

[22] Filed: Apr. 6, 1995

[30] Foreign Application Priority Data

Apr. 22, 1994 [GB] United Kingdom ............... 9408007

[51] Int. Cl.$^6$ .................. H04Q 7/00; H04Q 9/00
[52] U.S. Cl. ............. 455/53.2; 455/34.1; 455/34.2; 455/62
[58] Field of Search ................. 455/62, 52.1, 52.3, 455/49.1, 71, 73, 143, 134, 135, 33.2, 34.1, 34.2, 50.1, 63, 65, 67.3, 54.1, 54.2, 226.1, 226.2, 226.3; 379/60

[56] References Cited

U.S. PATENT DOCUMENTS

| | | | |
|---|---|---|---|
| 3,035,169 | 5/1962 | Griffith | 455/52.1 |
| 5,093,924 | 3/1992 | Toshiyuki et al. | 455/62 |
| 5,204,855 | 4/1993 | Bebee et al. | 370/50 |
| 5,212,803 | 5/1993 | Uddenfeldt et al. | 455/62 |
| 5,257,402 | 10/1993 | Crisler | 455/33.2 |
| 5,327,577 | 7/1994 | Uddenfeldt | 455/33.2 |
| 5,329,635 | 7/1994 | Wadin et al. | 455/33.2 |

FOREIGN PATENT DOCUMENTS

| | | | |
|---|---|---|---|
| 0411878A2 | 6/1991 | European Pat. Off. | H04Q 7/04 |
| 0530165A2 | 3/1993 | European Pat. Off. | H04Q 7/04 |
| 1328595 | 8/1973 | United Kingdom | H04B 7/00 |
| 2241135 | 8/1991 | United Kingdom | H04Q 7/04 |

*Primary Examiner*—Edward F. Urban
*Assistant Examiner*—Gertrude Arthur
*Attorney, Agent, or Firm*—Daniel C. Crilly

[57] ABSTRACT

A method as shown in FIG. 2 for allocating resources in a radio communications system having a plurality of communications resources for at least one receiver and transmitter to communicate over where the communications resources have signal levels which vary due to a multipath environment resulting in periods of poor communication quality over at least one particular communications resource including measuring at a first receiver a parameter indicative of a quality of communications between the first receiver and a first transmitter over a currently assigned communications resource and determining whether to allocate a different communications resource based on the measured parameter in order to effectively reduce periods of poor communications quality between the first receiver and the first transmitter.

9 Claims, 3 Drawing Sheets

METHOD FOR ALLOCATING COMMUNICATIONS RESOURCES IN A RADIO COMMUNICATIONS SYSTEM

FIELD OF THE INVENTION

This invention relates in general to a method for allocating communications resources for a receiver and transmitter to communicate over in a radio communications system, and more particularly to a method for allocating communications resources according to a parameter measured at a receiver.

BACKGROUND TO THE INVENTION

Mobile radio communications systems are well known and are generally referred to as communications systems that have a plurality of mobile stations that communicate via infrastructure or directly to one another. The infrastructure includes a base station and a system controller. The base station and each mobile station include a receiver and a transmitter for communicating to other base stations or mobile stations.

Mobile radio communications systems make use of radio frequency communications channels for communication between mobile stations and/or base stations. Mobile radio communications systems that make use of frequency division duplex (FDD) or time division multiple access (TDMA) as access modes are well known.

For a centrally controlled TDMA system, the mobile stations in the system will have access to a number of radio frequency carriers or carrier frequency pairs for communication, one or more of which may be available at each base site of the system. The carriers support control and traffic channels.

In TDMA communications systems a communication frequency or frequencies are divided into time frames each of which is divided further into time slots. Mobile stations may be assigned time slots to support their communication. The mobile stations communicate on their respective frequency at their respective assigned time slot(s) as assigned by the system controller of the radio communications system. A particular frequency and time slot may be referred to as a communications resource.

Since the radio frequency spectrum is a scarce resource and competition for spectrum allocation is increasing there is a greater need for radio communications system providers to make more efficient use of the limited radio frequencies that are allocated. Radio communications system providers must look at ways to make efficient use of their respective small allocated section of the radio spectrum through their ability to efficiently assign and reallocate communications resources.

Furthermore, there is continuous pressure on radio communications system providers to constantly improve quality on communications links. For example, the quality of communications signals between users needs to be improved by reducing the effects of interference and fading as much as possible.

Particularly, in TDMA systems when there are low user speeds, such as a pedestrian user, the resulting long fade durations can become a problem. Since the mobile user is moving slowly, or possibly not at all, the quality of communications of services that are delay constrained, such as speech and video, suffer. In GSM (Global System for Mobile Communications) systems, frequency hopping, with coding and interleaving may be implemented so that the communications is conducted over many frequency carriers to reduce the problems of long fade durations. Another approach for reducing fading problems is to implement automatic request for re-transmission with additional error protection on the repeats as described by Esa Malkamaki in "Burst-Level ARQ—An Adaptive Low Delay Error Protection Scheme for Speech Transmission in a TDMA System" presented at the Seventh IEE European Confererence on Mobile and Personal Communications, Brighton, December 1993, which has been discussed for the ATDMA research program for advancing TDMA communications systems. However, both frequency hopping and automatic request for re-transmission consume additional capacity because of the coding needed to implement either approach.

Frequency diversity allows the system controller of the radio communications system to allocate more than one radio frequency to a receiver and transmitter pair and allows the receiver to switch to a new radio frequency on the detection of poor link quality. However, for traditional frequency diversity the same information is being transmitted on two or more frequencies thus consuming valuable communications resources or system capacity.

Thus, it is desired to have a method of improving a quality of communications between a receiver and a transmitter without consuming system capacity or increasing the use of valuable communications resources.

SUMMARY OF THE INVENTION

According to the present invention, a method is provided for allocating communications resources in a radio communications system for at least one receiver and transmitter to communicate over including measuring at a first receiver a parameter indicative of a quality of communications between the first receiver and a first transmitter over a currently assigned communications resource and determining whether to allocate a different communications resource based on the measured parameter in order to effectively reduce periods of poor communication quality between the first receiver and the first transmitter.

In an alternative embodiment, the method further includes the step of allocating the currently assigned communications resource to a second receiver and a second transmitter while allocating a second communications resource that was being used by the second receiver and the second transmitter to the first receiver and the first transmitter for communication over thereby effectively exchanging the communications resources of at least two receiver and transmitter pairs.

DETAILED DESCRIPTION OF THE PREFERRED EMBODIMENT

Figure 1:
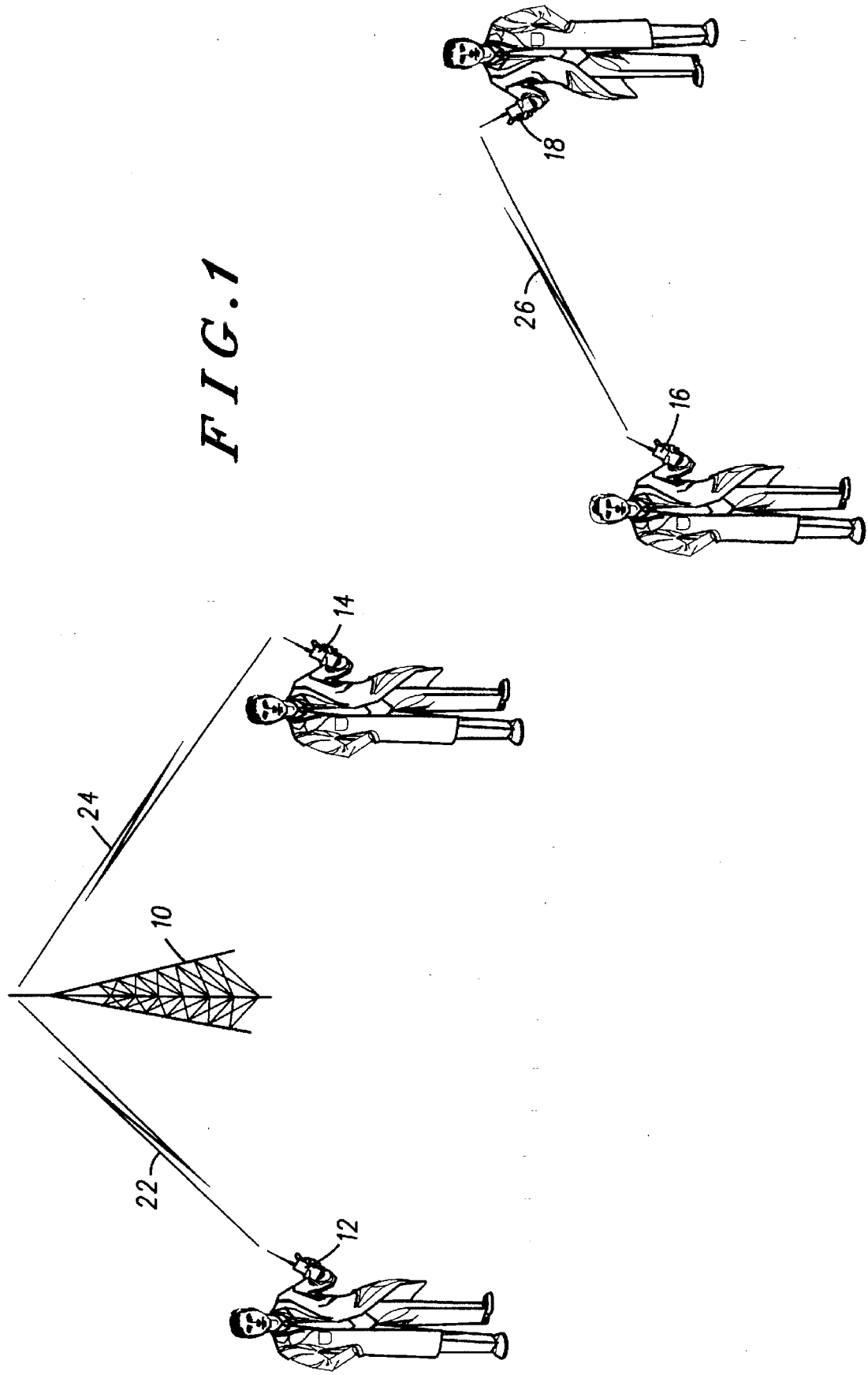
FIG. 1 shows a communication system including a plurality of mobile stations.

Referring to FIG. 1, there is shown a base station 10 including a system controller and a plurality of mobile stations 12, 14, 16, 18. The mobile stations 12, 14, 16, 18 are shown to be used by pedestrians but in fact the mobile stations may be used in vehicles or by any conventional manner. In other words, showing the mobile stations 12, 14, 16, 18 being used by pedestrians is merely suggestive and is not meant to be limiting. The following invention is also described with reference to a TDMA communications system but it may also be applied in other communications systems including other access methods such as FDMA.

In FIG. 1, a first mobile station 12 is communicating with the base station 10 over a first communications resource 22 and a second mobile station 14 is communicating with the base station 10 over a second communications resource 24. The communications resources may be any particular radio frequency or particular time slot and frequency in a TDMA communications system. Also shown in FIG. 1 is a third mobile station 16 communicating directly with a fourth mobile station 18 over a third communications resource 26. Each mobile station and base station includes a transmitter or receiver and thereby may be referred to as either a transmitter or a receiver. Although FIG. 1 shows only one base site, a communications system according to the present invention may have a plurality of base sites.

Figure 2:
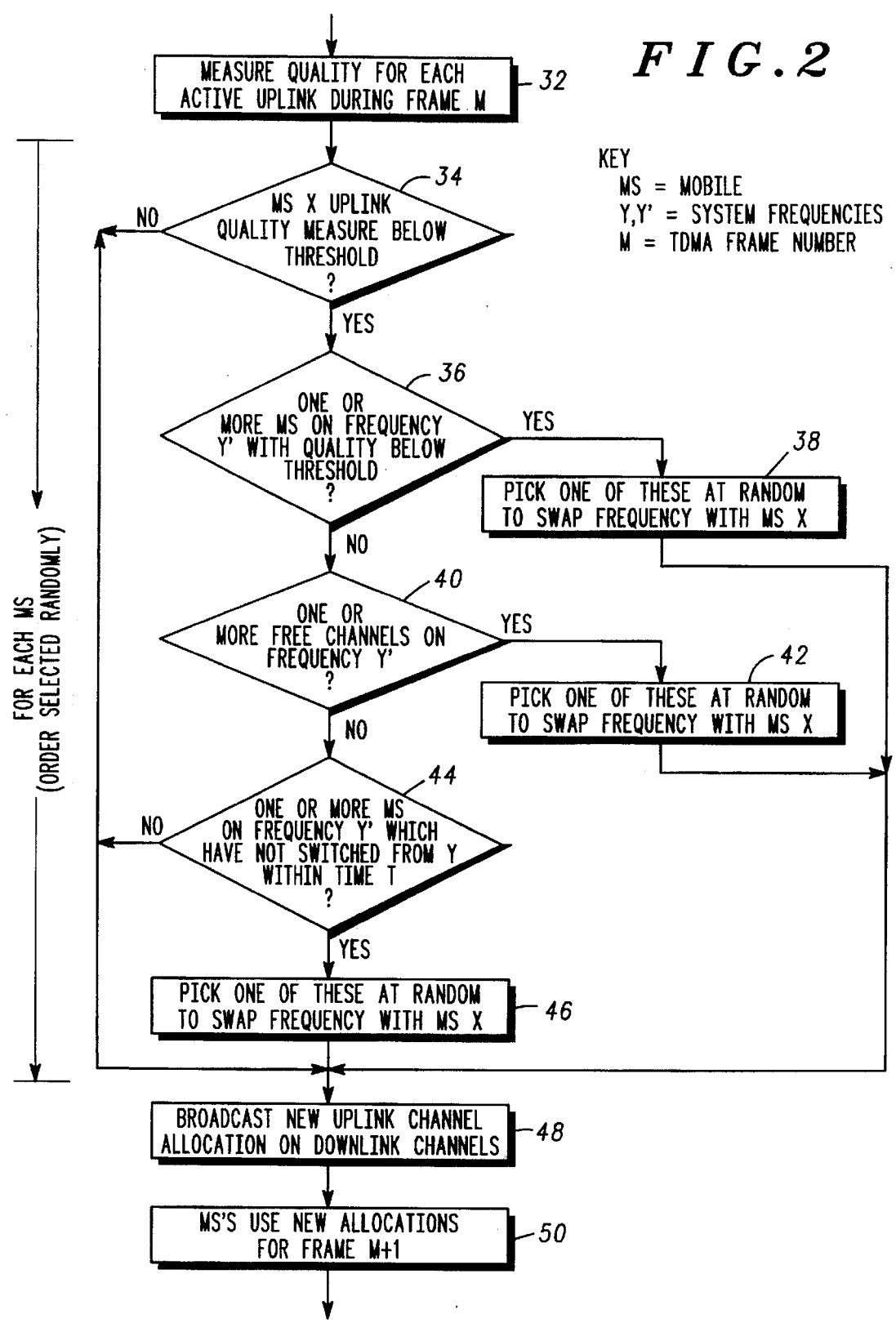
FIG. 2 is a flow chart for a preferred embodiment of the present invention.

FIG. 2 shows a flow chart for a base station operation for a TDMA uplink for a preferred embodiment of the present invention. Any transmission from a mobile station to the base station may be referred to as an uplink.

In step 32, the base station measures the quality of the communications for each active uplink during a time frame M. Quality may be measured in terms of error detection and/or signal strength. Error detection may be bit error rate or word error detection. The base station then stores the respective quality of each uplink communications.

If, in step 34, a particular uplink quality measures below a predetermined threshold then if one or more other uplinks on a different frequency have a quality measurement below the predetermined threshold value, as in step 36, then the base station exchanges the communications resources or swaps communications resources between the transmitters that had measured uplink quality below the threshold level 38.

If there are no uplinks on a different frequency that have a quality measurement below a threshold as in step 36 then as in step 40 it is determined whether there are any free or available channels on a different frequency. If so, one is allocated to the uplink that had a quality measurement below the threshold level, step 42. If not, then if one or more uplink communications on a different frequency that have not had their respective communications resources switched within a predetermined time as in step 44 is switched with the communications resource of a uplink communication that had quality measured below the threshold value, as in step 46.

In step 44, it may also be determined whether the uplink communication was recently reallocated and what was its previously allocated communications resources so that a communications resource will not be reallocated to an uplink communication that recently had a quality measurement below a threshold value with the particular reallocated communications resource.

The system controller may also determine a quality measurement for each uplink communication over one or more communications resource and then calculate an optimum allocation for all uplink communications at that base site or at a plurality of base sites if given the proper information regarding the communication links. Such optimisation may also be performed for the downlink communications.

If there are no available communications resources as determined in step 44 then the base station continues to measure the uplink quality of each uplink as in step 34 until a communications resource is found suitable for swapping with the transmitter of the uplink communication with a measured quality below the threshold value.

In step 48, the base station broadcasts the new uplink channel allocations on the downlink channels. Transmitting from the base station may be referred to as a downlink communication. The transmitters to the base station then use the new allocations for transmitting in time frame M+1, step 50.

A similar method may be employed for measuring the quality of a downlink communication. Each downlink communication is measured and when a particular downlink communication quality is measured below a threshold value then the communications resource being used is swapped with a communications resource of another downlink communication on a different frequency that has a quality measurement below a threshold value. If there are none available then an unallocated communications resource on a different frequency is swapped with the communications resource of the downlink communication that had a quality measurement below the threshold value. If there are no unallocated communications resources available then the communications resource is swapped with a communications resource on a different frequency that has not been swapped in a predetermined period of time or that was not previously swapped for having a quality measured below a threshold value. If there are still no such communications resources available each downlink is measured until one is found below the threshold value or is suitable for swapping. A mobile indicates the downlink quality to the system controller on an uplink communication.

Communications quality may be measured by conventional methods such as signal strength or error detection. The present invention may be combined with other error protection schemes such as coding and interleaving.

The present invention exploits the naturally occurring long fade duration experienced in a pedestrian environment. For example, in a TDMA system, a downlink communication where a mobile station is receiving a particular slot of the TDMA frame on a particular frequency and where error detection is being used, a long fade duration may result where many of the successive received slots are received in error if no action is taken. However, if there is a second communications resource, in terms of frequency, available which also exhibits independent fading, then there is a high probability that the mobile station may be able to receive slots without error on the second frequency.

Figure 3:
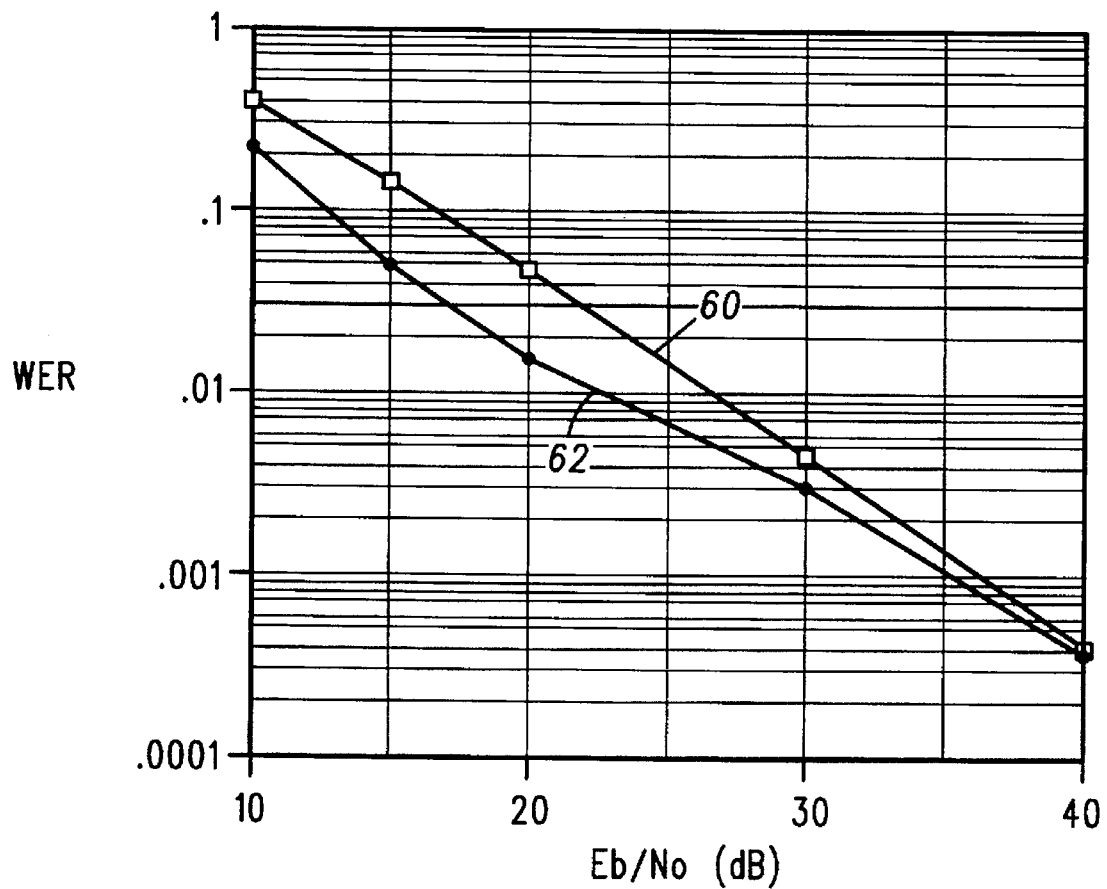
FIG. 3 is a graph plotting signal to noise measurements and word error rate for an embodiment of the present invention.

FIG. 3 is a graph of word error rate (WER) measured against signal to noise ratio for a TDMA system with the following parameters, two radio frequency carriers available, 4.65 milliseconds time frames, 10 TDMA time slots per frame, pi/4 DQPSK modulation scheme, 0.5 meter per second mobile speed, 2 Gigahertz frequency operation and independent Rayleigh fading between carriers. The graph shows a first line 60 that is a function of a system as described without employing a frequency or communications resource switching method. As a signal to noise ratio increases along the x-axis so does the word error rate percentage down the y-axis. A second line 62 plots word error rate and signal to noise ratio when a frequency switching method is employed according to the present invention. Similarly as the signal to noise ratio increases along the x-axis so does the word error rate percentage down the y-axis, however, in the lower signal to noise ratio areas such as 10 dB to 25 dB there is a significant increase in word error rate over the corresponding signal to noise ratio areas of the plot of the system that does not employ a frequency switching method. Thus, at the 5% WER level the frequency switching method provides 5 dB of system gain. The frequency switching method of the present invention provides a greater improvement at low signal to noise ratio's than at high signal to noise ratio's which is not a characteristic of traditional diversity methods that are known to those skilled in the art. The frequency switching method of the present invention is also applicable to systems where more than two radio frequency carriers (or carrier pairs) are available, in which case more system gain would result.

In an alternate embodiment defined by a ten time slot TDMA system having two radio frequency carrier pairs employing word error detection, a system controller may reallocate channel allocations or communications resources to provide a new radio frequency carrier for a particular transmitter and receiver pair when a word error occurs. In a TDMA communications system the frequency switching is controlled by the system controller. Thus, when a word error occurs during a communication between a transmitter and receiver pair, and the signal strength is low, the system controller attempts to reallocate a communications resource for the pair to communicate over according to the present invention. However, it is conceivable that if desired the reallocation may be provided by a mobile station or terminal providing that such reallocation is broadcasted accordingly to interested parties.

One downlink time slot may be reserved on each carrier for informing mobile stations of the allocation or reallocation as the case may be. Alternatively, a smaller allocation information time slot may be employed or the allocation information may be combined with other broadcast information (e.g. Broadcast Control Channel).

It is important that the allocation information is received by all mobiles with a high probability of success. The same allocation information may be repeated on both or all available radio frequency carriers. The mobile station may receive the allocation information on a particular communications resource that is providing the best quality at the time. The allocation information may be protected by error protection and detection codes.

Even with the above measures taken, there may still be a small probability that a mobile station cannot receive the allocation information. If so, either of the two uplink time slots which corresponds to the downlink time slots may be used by the mobile station to indicate that the allocation information was not received. Then the allocation information particularly pertaining to the mobile station that did not receive the allocation information earlier may be repeated on one or more of the subsequent reserved downlink time slots, or on some other downlink resource.

The present invention is especially applicable where a mobile station is moving at relatively slow speeds, for example, when a pedestrian uses a mobile station. At low speeds a fade duration is such that if the quality of a communications link is poor in one TDMA frame, there is a high probability that it will be poor in the following and subsequent frames. On the other hand, there is a high probability that the quality on another carrier, separated sufficiently in frequency, is good. Hence, if a mobile station switches to a new radio frequency on the detection of errors, according to the present invention, the communications quality will most likely improve.

Furthermore, error probability for all services on the particular carriers employing the present invention may be significantly reduced thereby increasing capacity or increasing portable battery life or both. The present invention solves the problems of long fade durations by reassigning or reallocating communications resources among users to accommodate improving communications quality. In conclusion, the present invention provides an efficient method for improving communications quality in a communications system by intelligently and expediently reallocating communications resources when deemed necessary.

We claim:

1. A method for allocating communications resources in a radio communications system having a plurality of communications resources for at least one receiver and transmitter to communicate over where the communications resources have signal levels which vary due to a multipath environment resulting in periods of poor communication quality over at least one particular communications resource, the method for allocating communications resources comprising the steps of:

measuring at a first receiver a parameter indicative of a quality of communications between the first receiver and a first transmitter over a first communications resource;

determining whether to allocate a second communications resource to the first receiver and the first transmitter based on the measured parameter;

upon determining that a second communications resource should be allocated to the first receiver and the first transmitter, allocating the first communications resource to a second receiver and a second transmitter; and allocating a communications resource that was being used by the second receiver and second transmitter to the first receiver and the first transmitter as the second communications resource, thereby effectively exchanging communications resources of at least two receiver and transmitter pairs in order to effectively reduce periods of poor communications quality due to multipath fading between the first receiver and the first transmitter.

2. The method of claim 1 wherein the step of determining takes into consideration a history of the allocations of other receiver and transmitter communications.

3. The method of claim 1 further comprising the step of reassigning more than two communications resources currently assigned among the receiver and transmitter pairs thereby changing allocation of communications resources among more than two pairs of receivers and transmitters to effectively increase the quality of communications for the reassigned pairs.

4. The method of claim 1 wherein the step of allocating the second communications resource comprises the step of allocating the second communications resource when the measured parameter is below a predetermined threshold value.

5. The method of claim 1, wherein the step of determining further comprises the step of calculating a global optimisation for allocation of all the communications links located at a base site.

6. The method of claim 1 wherein the step of determining includes calculating an optimal communications resource as the second communications resource.

7. The method of claim 1, wherein the receiver or transmitter is located at a base site controller.

8. The method of claim 1, wherein the step of determining takes into consideration a history of the quality of other receiver and transmitter communications.

9. A method for allocating communications resources in a radio communications network system having at least one base site and a plurality of frequencies for at least one receiver and transmitter to communicate over where the frequencies have signal levels which vary due to a multipath environment resulting in periods of poor communication quality over at least one particular frequency, the method for allocating frequencies comprising the steps of:

measuring at a first receiver a parameter indicative of a quality of communications between the first receiver and a first transmitter over a first frequency from the at least one site; and determining whether to allocate a second frequency from the at least one site to the first receiver and the first transmitter based on the measured parameter;

upon determining that a second frequency should be allocated to the first receiver and the first transmitter, allocating the first frequency to a second receiver and a second transmitter; and allocating a frequency that was being used by the second receiver and the second transmitter to the first receiver and the first transmitter as the second communications resource, thereby effectively exchanging communication frequencies of at least two receiver and transmitter pairs in order to effectively reduce periods of poor communications quality due to multipath fading between the first receiver and the first transmitter.

\* \* \* \* \*